United States Patent [19]

Bibl

[11] 3,744,139
[45] July 10, 1973

[54] APPARATUS FOR MEASURING OF TEST PIECES

[75] Inventor: Wilhelm Bibl, Braunschweig, Germany

[73] Assignee: Wenczler & Heidenhain, Traunreut near Traunstein, Germany

[22] Filed: June 10, 1968

[21] Appl. No.: 735,735

[30] Foreign Application Priority Data
June 8, 1967 Germany.......................... W 44133

[52] U.S. Cl. .............................. 33/174 P, 33/174 S
[51] Int. Cl. ............................................ G01b 5/20
[58] Field of Search....................... 33/174 P, 174 L, 33/174 S, 125 C

[56] References Cited
UNITED STATES PATENTS
3,353,275  11/1967  Porath.............................. 33/174 P
3,434,218  3/1969  Potter .............................. 33/125 C Primary Examiner—Leonard Forman
Assistant Examiner—Dennis A. Dearing
Attorney—Ernest G. Montague

[57] ABSTRACT

An apparatus for measuring of form-, position- and measure- deviations on test pieces and the like by means of a sensing system, which is displaceable relative to said test pieces, wherein the sensing system comprises two measuring tracers, one of the measuring tracers sensing the surface of the test pieces during its displacement. A reference face means is coordinated to the test pieces, and the other of the measuring tracers senses simultaneously the reference face. Means are provided for employing both measuring values delivered from the measuring tracers jointly for the determination of error values on points of the surface of the test pieces.

6 Claims, 14 Drawing Figures

INVENTOR
WILHELM BIBL
BY
ATTORNEY.

PATENTED JUL 10 1973 3,744,139

INVENTOR
WILHELM BIBL
BY
ATTORNEY.

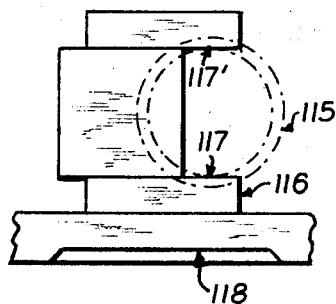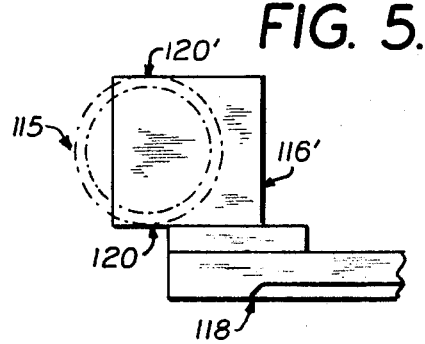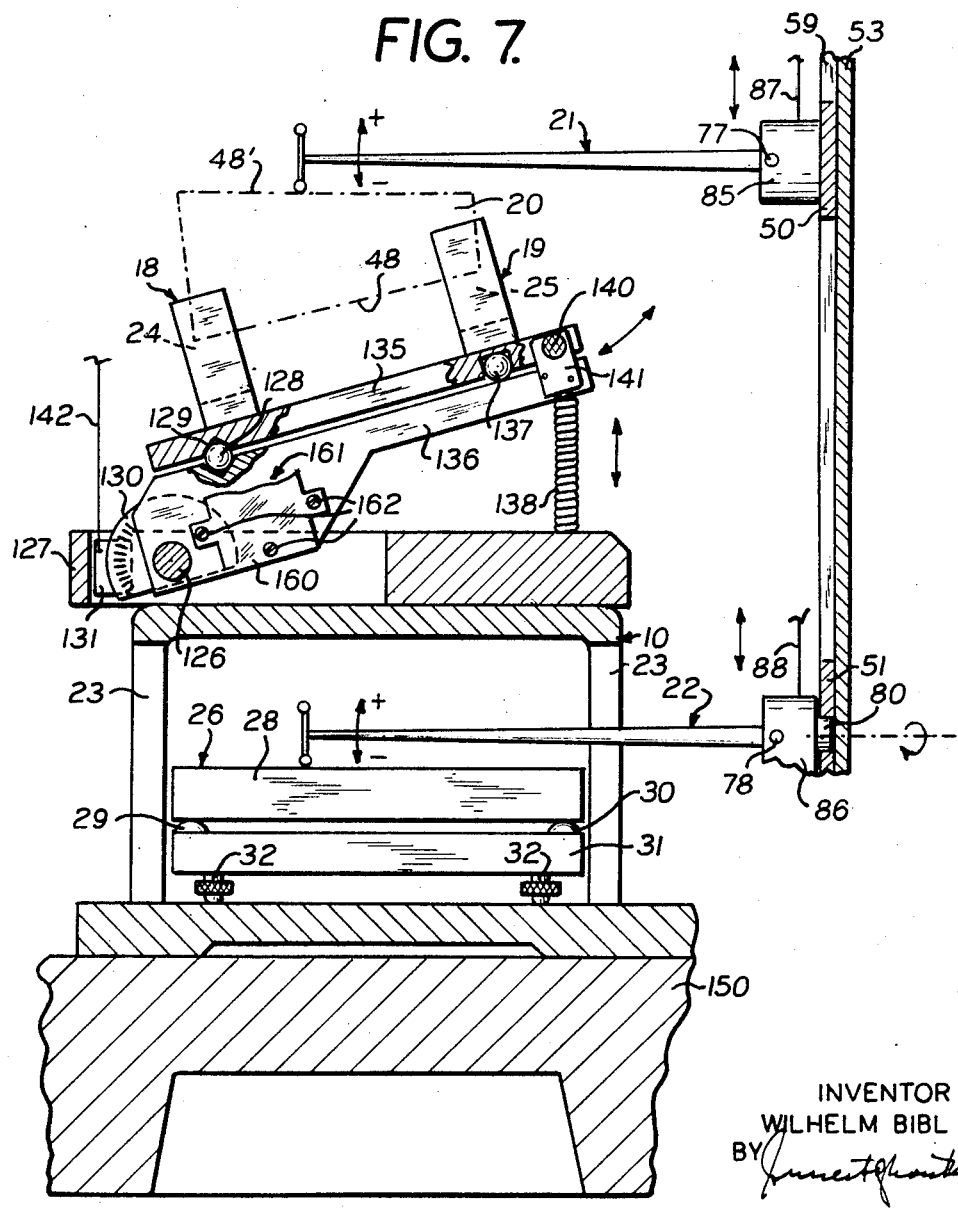

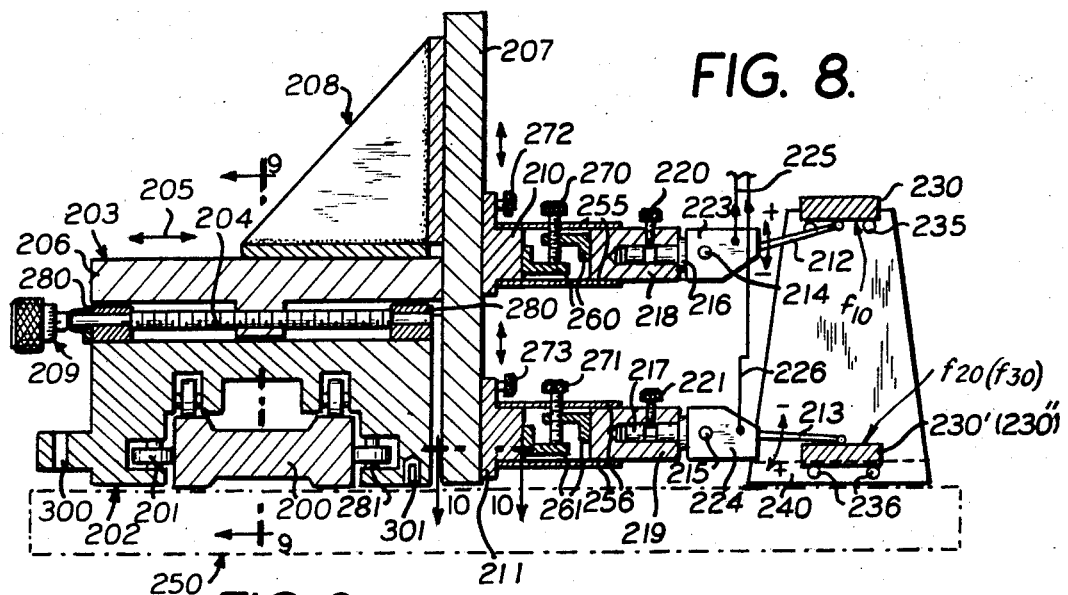
FIG. 8.
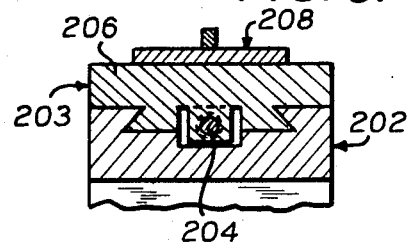
FIG. 9.
FIG. 10.
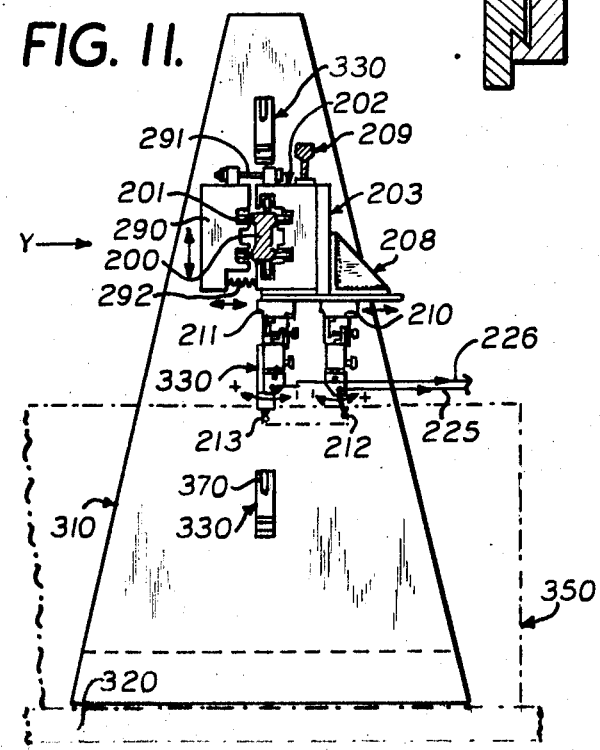
FIG. 11.
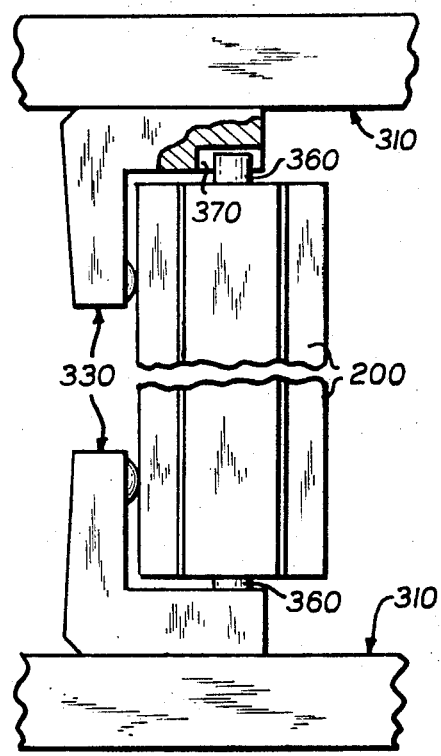
FIG. 12.
INVENTOR
WILHELM BIBL
BY
ATTORNEY.

APPARATUS FOR MEASURING OF TEST PIECES

The present invention relates to an apparatus for measuring of test pieces, in general, and such apparatus for measuring of form-, position - and measuring-deviations, for instance, on conical, cylindrical or strip-shaped test pieces and the like by means of a sensing system, which is displaceable relative to the test piece, in particular.

Measuring devices are known, in which the sensing system comprises a measuring tracer, which tests the face to be examined and is guided such, that it indicates the difference between the actual- and reference-profile line of the test piece to be measured. In devices of this kind, the measuring tracer provided for the testing of the test piece is arranged in known cases on a displaceable slide, the guide of which serves as a reference system for the measuring. The guide errors of the slide, which are caused knowingly by form-, position- and measuring deviations of guide elements, must be known or can be neglected relative to the form deviation of the test piece to be measured. In addition to the form-, position- and measuring-deviations of the guide elements for the slide carrying the measuring tracer, there also are other causes for deviations of the slide movement from a straight line, as for instance, controlled forces in case of non-favorable transmission of the driving forces onto the slide, a varying bending-through of the slide bed according to the prevailing position of the slide, etc.

Finally, during the displacement, smallest varying deformations of the slide carrying the measuring tracer can occur, which deformations cause a non-linear movement of the sensing ball of the measuring tracer.

Also the guide errors of the slide carrying the measuring tracer do not always reproduce themselves exactly; i.e., upon repeated displacement of the slide in the same positions of the slide the same guide error does not occur. For this reason, it is not possible by all means to determine the guide errors of the slide carrying the measuring tracer by a singular measurement with an even normal device and then to put to account in the form of a correction.

Furthermore, devices of this type are known, in which the measuring tracer supports itself on a reference face or on the face to be examined.

It is a drawback in devices of this type, however, that the constructive arrangement of these devices does not permit any selective spacial position of the reference face and of the face of the test piece to be measured. Also the device is not usable, if the face to be measured as well as the reference face do not permit a direct mechanical engagement.

It is one object of the present invention to provide an apparatus for measuring of test pieces, wherein the drawbacks of the known devices are avoided.

It is another object of the present invention to provide an apparatus for measuring of test pieces wherein the reference face and the faces of the test piece to be measured assume any selected distance from each other, without the possibility that guide errors of the displaceable and swingable parts exert a visible influence on the measuring result.

It is still another object of the present invention to provide an apparatus of the initially stated type, which is characterized by the greatest possible universality without being too expensive.

It is still another object of the present invention to provide an apparatus for measuring of test pieces, wherein the sensing system comprises two measuring tracers, one of which senses during its displacement the surface of the test piece, while simultaneously the other measuring tracer senses a reference face coordinated to the test piece, and that thereby both measuring values delivered from the measuring tracers are jointly used for the determination of error values at points of the surface of the test piece.

It is yet another object of the present invention to provide an apparatus for measuring of test pieces, which comprises a horizontally mounted cross slide (longitudinal-cross-slide) on which two measuring tracers, formed as sensing levers and displaceable in the vertical direction, are disposed on top of each other and a plane reference face is mounted horizontally and flush with the longitudinal slide. The sensing arms of the sensing levers, rotatable about their horizontal starting position, project beyond the longitudinal slide and are in contact by means of sensing balls, provided at their ends, with the reference face and with the tubular or conical test piece, respectively, which is disposed above the reference face.

The test piece, for instance, a cylindrical tube, is arranged on a table such that the tubular axis is parallel to the displacement direction of the longitudinal slide. For conical test pieces a table (for instance of the type of a sine table) can be measurably turned about a rotary axis disposed in cross direction.

The measuring of the cone angle and the form of the generating line of conical test pieces (outer- and inner-cone) takes place in such manner, that at first by displacement of the longitudinal slide, a generating line of the cone is sensed with the upper measuring tracer and simultaneously the reference face with the lower measuring tracer. Thereafter, the test piece is turned about a measurable angle (which differs only slightly from the actual cone angle), the upper measuring tracer is vertically displaced upon reversal of the measuring force direction, and finally, the other generating line of the cone of the particular axial length section, as well as the reference face are sensed. The sensing of the reference face taking place simultaneously with the sensing of the generating line of the cone makes it possible to eliminate the influence of the guide error of the slide onto the measuring of the form of the generating line. By the swinging of the test piece, the investigation of the cone angle is obtained by the determination of the inclination of two nearly parallel straight lines.

In a cylindrical test piece, the swinging of the test piece is omitted. In addition to the form of the generating line, here the diameter is determined by means of a normal (stop measure, gage) suitable for a substitution measuring and disposed flush with a test piece.

In test pieces with plane outer faces (wedge, parallelepiped) the measuring process is analogous.

In a further development of the present invention, the above-described apparatus is formed as follows:

1. The bed of the cross slide carrying the two measuring tracers and the uppermost part of a four-part table carrying the test piece, the two lower parts of which table make possible a measurable swinging of the test piece about a rotary axis disposed in cross direction, are rotatable about a vertical axis, relative to this swinging device over a rigid pivot point each.

On the measurable swingable part of the table carrying the test piece, an adjustable plane face is provided.

The carrier plate on which the reference face (for instance, plane face of a steel ruler) rests, is swingable about an axis disposed in longitudinal direction, for instance, by example, by means of three set screws. The bed of the cross slide carrying the two measuring tracers is, by example, swingable about an axis disposed in longitudinal direction, for instance, by means of three set screws.

2. On the uppermost part of the four-part table carrying the test piece is arranged a small table or the like. The small table serves the reception of the normal for the diameter determination in cylindrical test pieces.

3. For the reception of test pieces and the reference face a rectangular housing part is used, which is open on two oppositely disposed sides. The reference face with the carrier plate is arranged inside of the housing; it rests there on the base plate. The four-part table with the test piece is secured on the outside of the cover plate of the housing arranged opposite the base plate. The housing and the cross slide carrying the measuring tracer rests on a base plate.

4. The vertically arranged strip, on which the two measuring tracers are displaceably secured, is arranged on the side face of the cross slide pointing towards the test piece, which cross slide is arranged above the longitudinal slide.

By the invention, requirements, which results from geometrical and measuring technical considerations, are taken into account.

a. It is possible to adjust the displacement direction of the longitudinal slide carrying the two measuring tracers in a plane perpendicular to the rotary axis of the measurably swingable part of the table carrying the test piece, to align an axial longitudinal section of the test piece perpendicularly to this rotary axis, and, finally, to set the uppermost measuring tracer successively on the longitudinal section of the two generating lines of the adjusted axis longitudinal section. During the alignment of the test piece, no forces are exerted on the latter, so that deformations do not occur.

For the adjustment of the displacement direction of the longitudinal slide, at first the adjustable plane face, which is provided on the measurable rotatable part of the table carrying the test piece, is to be set perpendicularly to the rotary axis arranged in the cross direction. This takes place by using one of the measuring tracers, which is rotated about a horizontal axis disposed in an extension of its sensing arm for 90°, so that its measuring direction stands perpendicular to the plane face. In case of an unchanged slide position, the measurably rotatable part of the table now swings out; if thereby the amplitude of the measuring tracer does not change, the plane face stands perpendicular to the rotary axis. By displacement of the longitudinal slot, the plane face is sensed in longitudinal direction with the measuring tracer, and the slide bed is rotated over a fixed pivot point about a vertical axis as long, until the displacement direction of the longitudinal slide is parallel to the plane face. Finally, the measuring tracer is turned again into the original position (measuring direction vertical).

For the adjustment of an axial longitudinal section of the test piece perpendicular to the rotary axis of the measurable swingable part of the table carrying the test piece, at first, the reference face is to be set parallel to this rotary axis. This setting takes place, for instance, by means of a 90° angle stop measure, which is wringed to the mentioned plane face, which is arranged on the measurably rotatable part of the table carrying the test piece. Thereafter, the horizontal place face of the angular stop measure, which is parallel to the rotary axis, is sensed with the upper measuring tracer, as well as simultaneously the reference face is sensed with the lower measuring tracer by displacement of the cross slide and by swinging of the carrier plate about an axis disposed in longitudinal direction, the reference face disposed on the carrier plate is aligned parallel to the horizontal plane face of the angular stop measure.

For the adjustment of the test piece itself in two different positions of the longitudinal slide at first the lowermost arranged longitudinal strip of the generating face of the test piece is sensed with the upper measuring tracer and simultaneously the reference face is sensed with the lower measuring tracer by displacement of the cross slide in cross direction and are secured in this manner in two positions the return points related to the reference face. Now, the uppermost part of the four-part table carrying a test piece is rotated with a pivot point about a vertical axis until the turning points are found on both positions in the same position of the cross slide. Thereby, a generating line of the test piece and the axial longitudinal section coordinated thereto is brought into the desired position. For finding of the second generating line of this axial longitudinal section, the upper measuring tracer is displaced vertically upwardly upon reversal of the measuring force direction and at one position of the uppermost arranged longitudinal strip of the generating face of the test piece, the highest point related to the reference face is searched for by displacement of the cross slide.

b. The measuring faces of a stop measure and a stop measure gage, respectively, which are arranged flush to the two generating lines of the axial longitudinal section to be measured, for the determination of the diameter in cylindrical test pieces can be set perpendicularly to the latter and parallel to their generating lines, since they can be aligned parallel to the reference face. The stop measuring gages and the stop measure, respectively (the latter with intermediate arrangement of a stop measure set off to the latter), is wringed onto the small table, which is disposed by example on the upper part of the four-part table carrying the test piece. Thereafter, a measuring face of the stop measure gauge and of the stop measure, respectively, is sensed with the upper measuring tracer, as well as the reference face with the lower measuring tracer in longitudinal direction (by displacement of the longitudinal slide) and thereafter in cross direction (by displacement of the cross slide). By swinging of the carrier plate, the reference face disposed thereon is aligned parallel to the measuring face of the stop measuring gage and the stop measure, respectively.

c. The distance between the test piece and the reference face remains equal, under the presumption of a constant temperature, during the measuring process. A variation of the distance could occur only upon variation of the deformation state of the housing receiving the test piece and the reference face. Such deformation variation is not possible, however, since it is built only above the base plate on which the cross slide carrying the two measuring tracers and the housing could be brought on the latter. The bent-through variations of the base plate occurring during displacement of the longitudinal slide can cause merely a swinging of the housing.

d. The distance between the two measuring tracers remains equal, assuming constant temperature, during the measuring process. A variation of the distance could occur only upon variation of the deformation state of the strip, on which the two measuring tracers are displaceably secured. Such deformation variation is, however, not possible, since it could only by means of the cross slide, on the side face of which the strip is secured, be brought onto the latter. Since the joint contact face is small and no webs are provided between the strip and the slide, the bent through variations of the longitudinal slide, as much as they are transferred on the cross slide, can cause merely a swinging of the strip during its displacement.

With these and other objects in view, which will become apparent in the following detailed description, the present invention will be clearly understood in connection with the accompanying drawing, in which:

FIG. 4 is an elevation seen in the direction of the arrow x of FIG. 3;

FIG. 5 is an elevation of the device disclosed in FIG. 3 for measuring of the outer diameter of tubular test pieces.

FIG. 7 is an elevation partly in section of another embodiment of the present invention for measuring of conical test pieces or the like;

FIG. 8 is another embodiment of the apparatus for measuring the form deviations of strip-like test pieces and the like;

FIG. 9 is a section along the lines 9—9 of FIG. 8;

FIG. 10 is a section along the lines 10—10 of FIG. 8;

FIG. 11 is an elevation partly in section of the embodiment of the apparatus disclosed in FIG. 8, however, with an additional device which permits the measuring of groove-shaped recesses in the test piece; and FIG. 12 is an end view of the apparatus seen in the direction of the arrow y of FIG. 11.

Figure 1:
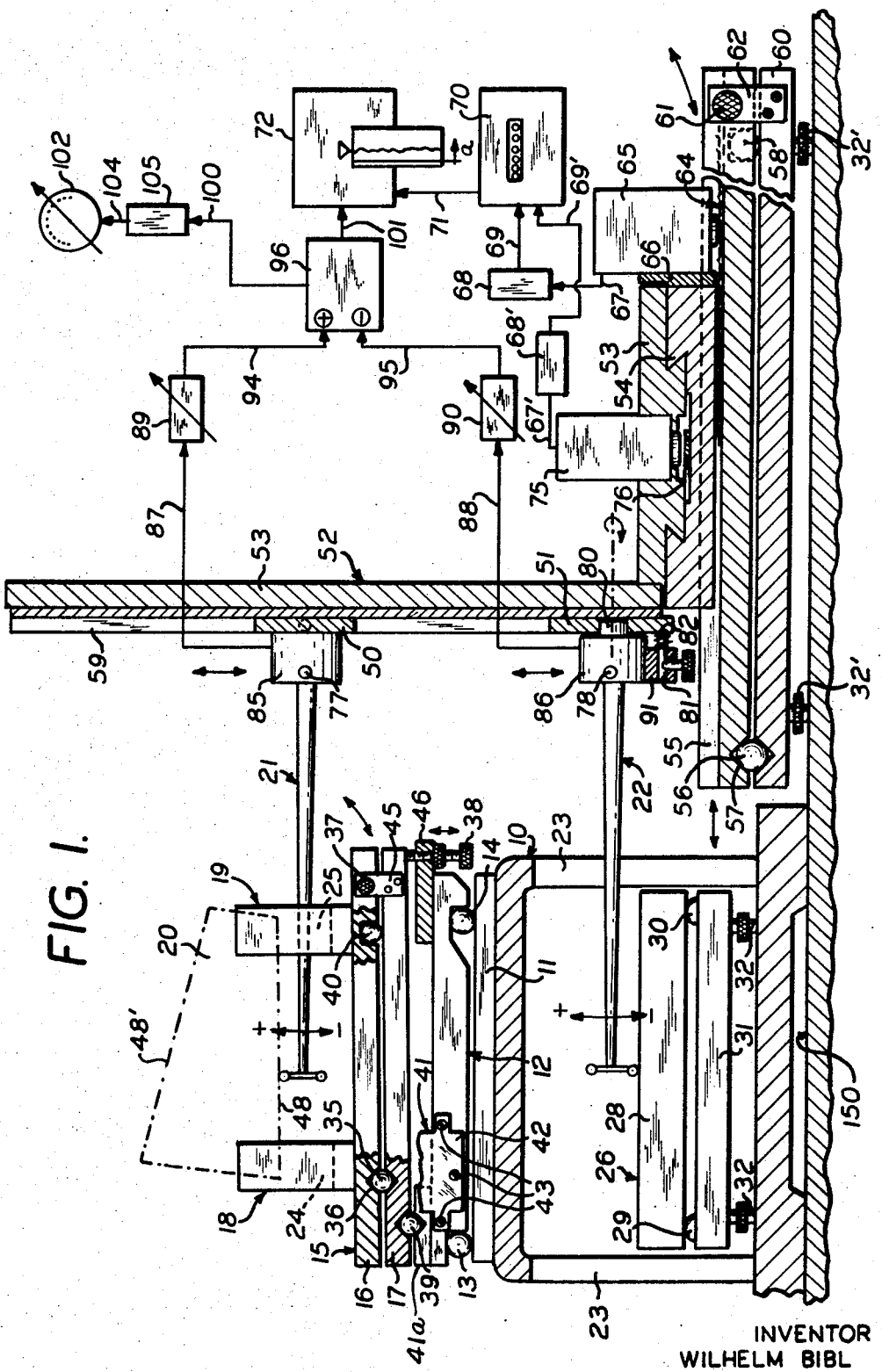
FIG. 1 is an elevation, partly in section, of the apparatus designed in accordance with the present invention, shown schematically and not according to measure, for measuring of conical test pieces.

Referring now to the drawings, and in particular to FIG. 1, the apparatus designed in accordance with the present invention comprises a housing part 10, on which by means of an intermediate plate 11 a sine table 12 of known structure equipped with cylindrical rollers 13 and 14 is mounted. The swinging axis of the sine table 12 is constituted by the cylindrical roller 13, which supports itself on the intermediate plate 11. The sine table 12 in turn is carrier of an adjustment device 15 which comprises two parts, namely an upper part 16 and a lower part 17. The upper part 16 is, in accordance with the present invention, swingable about a vertical axis, for instance, by means of a ball pivot 35, 36, as well as rotatably mounted balls 40 relative to the lower part 17. This swinging is caused by means of two screws 37 operatively engaging on both sides of the upper part 16, which screws 37 are inserted each into a counter bearing 45 secured to the lower part 17 and makes possible a fine rotation of the mentioned part. The lower part 17 of the adjustment device 15 is swingable by means of a screw 38, which is provided in a counter bearing 46 secured to the sine table 12, relative to the sine table, about an axle 39 disposed parallel to the swinging axis of the sine table 12.

The sine table 12 is furthermore the carrier of a plate 41, the plane face 42 of which is adjustable by means of screws 43 in the manner of, by example, a spectrometer table. The plate 41 is plane parallel, and the plane face pointing to the sine table has as to its surface-characteristics stop measure qualities. On the second not visible side face of the sine table, a counter weight corresponding with the weight of the plate 41 is provided. The upper part 16 of the adjusting device 15 carries a longer receiving prism or two shorter flush disposed receiving prisms 18 and 19 for the test piece 20. The faces disposed angularly relative to each other of the receiving prisms 18 and 19 are suitably of crown shape. The distance between the two receiving prisms 18 and 19 in the direction of the axis of the test piece 20 is settable or adjustable, depending upon the length of the test piece 20. For this purpose, the receiving prisms 18 and 19 are linearly displaceable on the upper part 16 of the adjustment device 15 in guides (not shown). The receiving faces 18 and 19 have recesses at the prism edge for the sensing arm of a measuring tracer 21.

Inside the housing 10, which has two openings 23 on oppositely disposed sides, is arranged a strip 28. The latter, one plane face of which is the reference face 26 pointing to a measuring tracer 22, is disposed above supporting members 29 and 30 on a carrier plate 31 which, in turn, supports itself by means of three set screws 32 on the bottom of the housing 10. By means of the three set screws 32 the carrier plate 31 is adjustable as to its height and swingable. The measuring tracers 21 and 22 are displaceable by means of a slide 50 and 51, respectively, in vertical direction along a guide rule 59. The guide rule 59 is secured to the cross slide 52. The upper part 53 is displaceable in cross direction (parallel to the rotating axis defined by cylindrical roller 13 of the sine table 12) and the lower parts or longitudinal slide 54 is displaceable in longitudinal direction (parallel to a horizontal straight line, which is disposed perpendicular to the rotary axis roller 13 of the sine table 12).

The cross slide bed with the straight guide 55 provided thereon for the longitudinal slide 54 is swingable, in accordance with the present invention, by example, by means of a ball pivot 56 and 57, as well as rotatably mounted balls 58 relative to an immovable plate 60 about a vertical axis. This swinging movement is caused by means of two screws 61 provided on both sides of the straight guide 55, which screws 61 are provided in each of counter bearings 62 secured on the plate 60 and makes possible a fine setting rotation of the mentioned part. The dove-tail guide, shown in the drawing for simplicity reasons for the slides 50, 51, 53 and 54, is suitably to be replaced by a substantial friction free ball guide, or the like.

For the measuring of the displacement path of the longitudinal slide 54, as well as for the cross-slide 53, measuring devices 64, 65, as well as 75, 76 are provided, which in FIG. 1 are, by example, photoelectric lighting grid sensing devices. The lighting grid measure rule 64 for the longitudinal slide 54 is secured to the bottom side of the guide part 55, while the sensing device 65 is provided above a holder 66 on the longitudinal slide 54. The lighting grid measuring rule 76 for the cross slide 53 is secured in a recess of the longitudinal slide 54, while the sensing device 75 is secured in a cut out of the cross slide 53 immovably in a manner not shown. The electrical output signals delivered by the photo-electric sensing device 65 and 75, respectively, are fed in FIG. 1 by means of an electric conduit 67 and 67', respectively, to an amplifier 68 and 68', respectively, and is then fed by means of the electrical conduit 69 and 69', respectively, to a direction discriminator and a counter circuit 70 of known structure, which transforms the electrical signals into length data, which is, however, not subject matter of the present invention and for this reason does not require any further explanation. The electronic counter 70 is equipped with a switching device, which releases selectively the impulses of one or the other measuring device 65 and 75, respectively, for counting. Control pulses are emitted advantageously to the advancing device for the paper strip of the writing instrument 72 by means of the output conduit 71 of the electronic direction discriminator and counting circuit 70, so that the paper advance takes place synchronously with the displacement of the longitudinal slide 54. The provided lighting grid sensing device 75, 76 provided in FIG. 1 for measuring of the displacement path of the cross slide 53 can also be replaced by a measuring clock.

The measuring tracers 21 and 22 are formed as sensing levers, which are rotatable each about an axle 77 and 78, respectively, disposed in cross direction. The measuring tracer 22, sensing in FIG. 1 the reference face 26, is rotatable for the purpose of adjusting in addition about a horizontal axis 80 disposed in an extension of the sensing arm for 90° and, by example, the rotatable measuring tracer 22 is securable by means of a resilient arresting pin 81 which in turn is guided play free in a slotted part 91. The arresting pin 81 engages thereby conical bores 82 of the slide 51.

The rotary movement, which the shorter lever arm of the measuring tracers 21 and 22, respectively, carries out during the measuring process, in known manner is transformed, by example, by inductive means over a differential transmitter into an electrical signal potential proportional to the rotary movement. The starting potentials of the measuring tracers 21 and 22 are balanced over electric conduits 87 and 88 by means of potential dividers 89 and 90. The starting signals of the measuring tracers 21 and 22 are fed by means of electric conduits 94 and 95 to an electrical structural unit 96 in which they are electrically added or subtracted and the result is amplified and rectified in face dependency. If only one measuring tracer is connected with the electrical structural unit 96, then only its starting signal is amplified and rectified. As can be ascertained from FIG. 1, the measuring tracers 21 and 22 are switched such and arranged on their slides 50 and 51, respectively, such that, by example, rotation of their sensing arms in clockwise direction delivers both positive measuring values. The measuring values are subtracted, in order to remove the guide error. If the measuring values delivered from the tracers 21 and 22 are electrically subtracted, the vertically directed translation component of the guide errors of the slide 54 are compensated and the difference of the form deviations of the generating line of the test piece 20 and the corresponding profile line of the plane reference face 26 is indicated. If the form deviation of the reference face 26 is neglectably small, the generating line form errors of the test piece 20 are readable directly on the indicator instrument 102 or on the paper strip of the writing instrument 72. An electrical conduit 101 connects the writing instrument 72 with the electrical structural unit 96 subtracting and adding, respectively, the measuring values of the tracers 21 and 22, respectively. The pointer instrument 102 is operatively connected on the structural unit 96 subtracting and adding, respectively, the measuring value by intermediate arrangement of an amplifier 105 over electrical conduits 100 and 104.

Below, the measuring of the cone angle and of the generating line form of a conical test piece with the above described apparatus, according to the present invention, is more clearly explained. Prior thereto, the adjustment required therefor is described.

First, the reference face 26 parallel to the displacement direction of the longitudinal slide 54 and the cross slide 53 are set after the latter has been substantially horizontally aligned by means of three set screws 32' provided on the plate 60. By displacement of the slide 51, the measuring tracer 22 is brought into engagement with the reference face 26 and the latter by displacement of the longitudinal slide 54 is sensed with the measuring tracer 22. By observation, by example, of the recording curve provided on the writing instrument 72 and simultaneous swinging of the carrier plate 31 by means of the set screws 32, the reference face 26 is aligned parallel to the displacement direction of the longitudinal slide 54. In analogous manner, the reference face 26 is adjusted parallel to displacement direction of the cross slide 53.

Thereafter, the displacement directions of the slide 54 and 50 are to be aligned in a plane perpendicular to the axis of rotation defined by the cylindrical roller 13 of the sine table 12 and the reference face 26 parallel to this rotating axis 13. These adjustments take place by means of the plate 41 which is set perpendicular to the rotating axis of the roller 13 of the sine table 12. At first, the adjustment device 15, consisting of two parts 16 and 17, is removed by unscrewing the counter bearing 41a receiving the rotary axis 39 from the sine table 12. Thereafter, the measuring tracer 22 swings about the axis 80 for 90°, is arrested in this position and brought into contact with the plate 41 secured to one of the two plane faces 42 of the plate 41 secured to the sine table 12. Then (with unchanged position of the longitudinal slide 54 and the cross slide 53) by swinging of the sine table 12 about its rotary axis defined by the roller 13 as well as by observation by example of the recording curve formed on the writing instrument 72 and simultaneous adjustment of the plate 41 by means of the set screws 43, the place face 42 is adjusted perpendicularly to the rotating axis defined by the roller 13 of the sine table 12. Thereafter, by displacement of the longitudinal slide 54 with the measuring tracer 22, the plane face 42 is sensed in the longitudinal direction and by observation, by example, of the recording curve of the writing instrument 72 as well as by simultaneous swinging of the cross-slide bed by means of the screws 61 over the pivot 56 and 57 the displacement direction of the longitudinal slide 54 is adjusted in a plane perpendicular to the rotating axis defined by roller 13 of the sine table 12. Finally, (with unchanged position of the longitudinal slide 54 and of the cross slide 53) with the measuring tracer 22 by displacement of the slide 50, the plane face 42 is sensed in the vertical direction. By observation, by example of the recording curve of the writing instrument 72 and simultaneous swinging of the cross slide bed by means of the set screw 32' provided on the plate 60, the displacement direction of the slide 50 is aligned parallel to the plane face 42. Now, the measuring tracer 22 swings back again about its axis 80 for 90° and is arrested in the working position shown in FIG. 1 of the drawings. For the adjustment of the reference face 26, a 90° angle stop measure is wringed on and the horizontal plane face of the angle stop measure is sensed with the measuring tracer 21 as well as simultaneously the reference face 26 is sensed with the measuring tracer 22 is sensed by displacement of the cross slide 53. By observation, by example, of the recording curve of the writing instrument 72 (which indicates the difference of the measuring values of the two connected measuring tracers 21 and 22 connected to the electrical structural unit 96) and simultaneous swinging of the carrier plate 31 by means of the three set screws 32, the reference face 26 is adjusted parallel to the rotating axis of the roller 13 of the sine table 12.

Now, the adjustment device 15 is mounted again on the sine table 12, and if required, the distance of the receiving prisms 18 and 19 in longitudinal direction is varied such that the test piece 20 can be inserted into the pair of prisms 18 and 19.

The conical test piece 20 is adjusted such that its axial longitudinal section stands perpendicular to the rotating axis of the roller 13 of the sine table 12, i.e. parallel to the displacement direction of the longitudinal slide 54 and perpendicular to the reference face 26. At first, the lowermost longitudinal strip of the generating face of the test piece 20 is aligned approximately parallel to the reference face 26 by sensing by displacement of the longitudinal slide 54 a line of the mentioned generating line strip with the measuring tracer 21 and simultaneously the reference face 26 with the measuring tracer 22. By observation, by example, of the indication of the pointer instrument 102 and swinging of the lower part 17 of the adjustment device 15 about the rotary axis 39, which takes place by means of the screw 38, the test piece 20 is set such that the indication delivered from the measuring tracers 21 and 22 remains within the chosen measuring range of the indicator instrument 102. Thereafter, by displacement of the longitudinal slide, the measuring tracer 21 is brought to the end, adjacent the pivot 35, 36 of the sensed line on the generating strip of the test piece 20, and the value corresponding to the position of the cross slide 53 is determined by means of the measuring device 75, 76, as well as the deviation, by example, of the indicator on the indicator instrument 102 is determined. Now, by displacement of the cross slide 53, the test piece 20 is sensed with the measuring tracer 21 and simultaneously the reference face 26 with the measuring tracer 22 in crosswise direction. The deviation of the pointer on the pointer instrument 102 changes thereby. Upon crossing of the axial length section looked for the pointer of the instrument 102 comes to a standstill (returning point) and moves then in opposite direction. At a predetermined position of the cross slide 53 (the corresponding value is likewise read on the measuring device 75, 76) is finally the deviation on the pointer instrument 102 is finally the same, as at the start of the cross displacement of the slide 53. Since the last position of the cross slide 53 has the same distance from the axial length section looked for at the starting position, the cross slide 53 is set to the arithmetic median of the measuring rule values, which correspond to these two slide positions. Often also this position of the cross slide 53 is determined directly by means of the return point. With the at first discussed method, which is the more exact one, also a larger in cross direction disposed chord can be measured, whereby then the returning point can no more be seen on the indicator instrument 102. After in this manner the lowermost disposed longitudinal strip of the generating face of the test piece 20 has been found in relation to the reference face 26, as the lowermost disposed point, i.e. a point of the generating line 48, the measuring tracer 21 is brought by displacement of the longitudinal slide 54 to the other end of the jacket strip. Thereafter, by observation, by example, of the indicator instrument 102, the upper part 16 of the adjustment device 16 is brought by swinging over the pivot 35, 36 in such position, in which on the pointer instrument 102 the reversing point is indicated. Thereby, the generating line 48 of the test piece 20 and the axial longitudinal section obtaining thereto is brought into the desired position. Finally, the generating line 48 is set in the above-described manner exactly parallel by means of the lower part 17 of the adjusting device 15 and of the measuring tracers 21 and 22, to the reference face 26. The determination of the form of the jacket line and of the cone angle of the test piece 20 takes place in such a manner that, by displacement of the longitudinal slide 54, the generating line 48 of the test piece 20 is sensed with the measuring tracer 21 and simultaneously the reference face 26 with the measuring tracer 22 continuously. The form error, to be found, of the generating line 48 can then be read on the paper strip of the writing instrument 72. Then the sine table 12, in accordance with FIG. 2 of the drawings, can swing by supporting the parallel stop measure 110 about the rotary axis of the roller 13 for a known angle, which varies only slightly from the actual cone angle and the measuring tracer 21 is vertically upwardly displaced upon reversal of the measuring force direction by means of the slide 50. Thereafter, the uppermost disposed longitudinal strip of the jacket face of the test piece 20 is sensed with the measuring tracer 21 as well as simultaneously the reference face 26 with the measuring tracer 22 in cross direction, and in this manner at a point of the jacket strip the highest disposed point in relation to the reference face 26 is found, i.e. a point on the jacket line 48'. Now, by displacement of the longitudinal slide 54, the generating line 48' of the test piece 20 is sensed continuously with the measuring tracer 21 and simultaneously the reference face 26 with the measuring tracer 22. The form error of the generating line 48' to be found and the deviation of the actual cone angle from the nominal value can be read again on the paper strip of the writing instrument 72. The positions of the cross slide 53 which are set for the sensing of the generating lines 48 and 48', respectively, of the test piece 20, differ only slightly from each other when the adjustment of the displacement direction of the slide 50 has been done parallel to the plane face 42 and the guide errors of the straight guide 59, as well as the displacements by the clamping of the slide 50 (important is only the component in the cross direction) is not too large. If these presumptions are complied with, then the lines of the reference face 26 disposed in parallel profile sections which upon displacement of the longitudinal slot 54 are sensed simultaneously with the generating lines 48 and 48', respectively, of the test piece 20 are directly adjacent each other and thus nearly equal. In case of a larger displacement of both profile lines, either the height profile of the corresponding length strip of the reference face must be known, or the unevenness thereof must be negligibly small.

Figure 2:
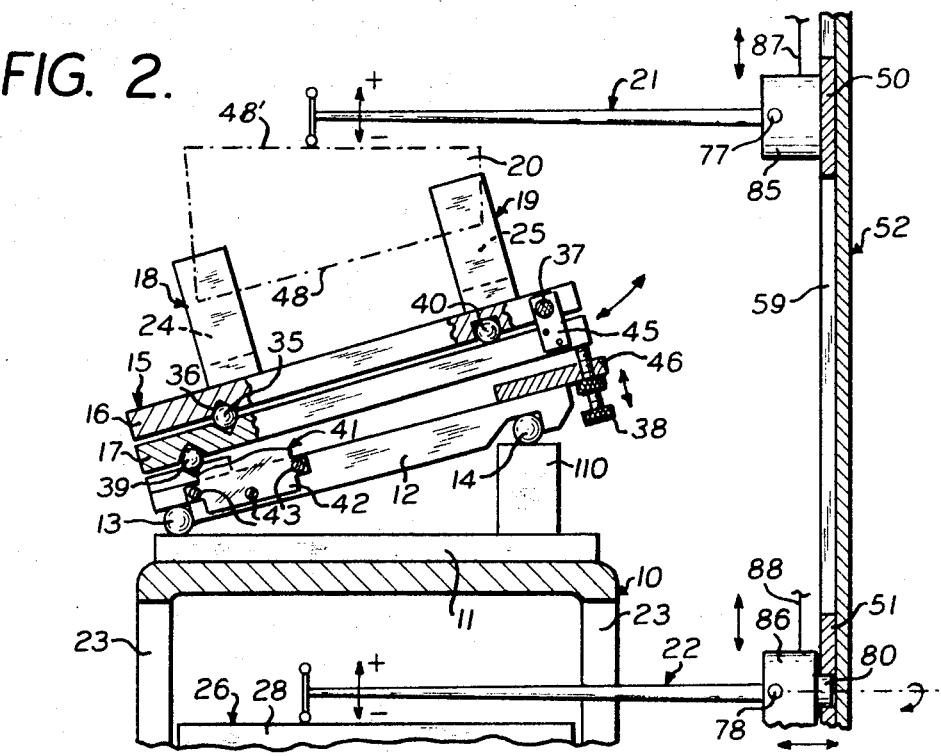
FIG. 2 is a fragmentary elevation partly in section of the apparatus shown in FIG. 1, however, in a different measuring position.
Figure 3:
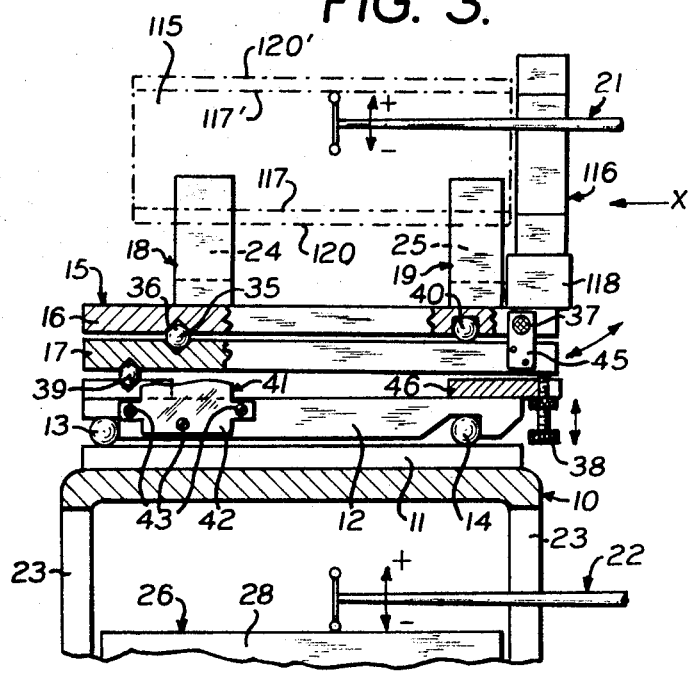
FIG. 3 is a fragmentary elevation of the apparatus shown in FIG. 1, however, with an additional device for measuring the diameter of for instance tubular test pieces.

The apparatus described in connection with FIGS. 1 and 2 of the drawings for the measuring of conical test pieces can be applied also for the measuring of the wall thickness, the unevenness of the generating line and the inner and outer diameters of cylindrical tubes 115 in accordance with FIGS. 3 to 5. Closely above the upper part 16 of the adjustment device 15 is arranged a small table 118, which supports itself either on the housing part 10 or, as is the case in FIG. 3, directly on the upper part 16 of the adjustment device 15. The table surface, which is supposed to be substantially horizontal, has in relation to its surface characteristics stop measure quality. A stop measuring gage 116 is wringed on the table surface, in accordance with FIG. 4. The medium and lower stop measure is chosen such that the measuring faces disposed on the inner side of the stop measure gage is flush to the generating line 117 and 117' of the tube 115. Thereafter, one of the two measuring faces of the stop measure gage 116 is sensed with the measuring tracer 21, as well as the reference face 26 with the measuring tracer 22 in longitudinal direction (by displacement of the longitudinal slide 54) and thereafter in cross direction (by displacement of the cross slide 53).

By observation, by example, of the recording curve of the writing instrument 72 and swinging of the carrier plate 31 by means of the set screws 32, the reference face 26 is aligned parallel to the measuring face of the stop measuring gage 116. The adjustment of the cylindrical bore of the tube 115 and the following measuring process are analogous of the procedure set forth above in connection with FIG. 1; only the sine table 12 is not subjected to swinging thereby.

One obtains a complete recording of the axial longitudinal section of the bore (inner diameter of the tube 115, form errors of the generating line 117 and 117', as well as its inclination relative to each other).

If, in accordance with FIG. 5, the end measure combination 116' consisting of two stop measures set off relative to each other is chosen such that the measuring faces at the upper end measure are flush with the outer generating lines 120 and 120' of the tube 115, then additionally the axial longitudinal section of the outer cylinder (outer diameter of the tube 115, form errors of the generating lines 120 and 120', as well as their inclination relative to each other) and thereby the wall thickness of the tube 115 can be determined.

The measuring of the gaging rings and setting rings is particularly advantageous with this apparatus. Errors of the second order in the determination of the diameter, which can occur in other measuring arrangements by an inclination of the measuring direction to the ring diameter (by example by inclination of the bore axis to the end faces of the ring) are here omitted. Also, the bending through of the sensing arm occurring by the measuring force of the sensing arm of the measuring tracer is without influence. Finally, the conventional measuring arrangements deliver only the ring diameter, however, not the generating line form. The gage ring to be measured is clamped in a manner not shown to an end face, by example, the receiving prism 19 in FIG. 3, or one uses instead of a receiving prism a suitable receiving block, which is equipped with a set off for support of the ring to be measured. The adjustment - and measuring-process is equal to that described in connection with FIG. 3.

Figure 6:
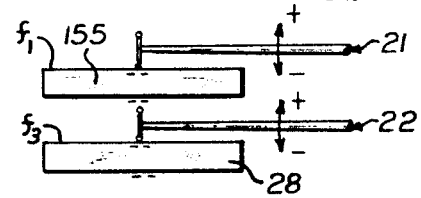
FIGS. 6, 6a and 6b are schematic elevations disclosing individual measuring steps for the determination of the form-deviations of strip-shaped test pieces.
Figure 6A:
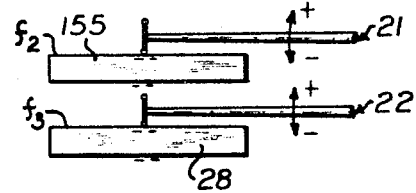
Figure 6B:
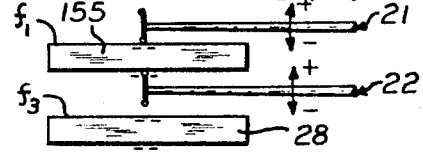

The apparatus described on the basis of FIG. 1 for the measuring of conical test pieces can be applied with slight variations also for the measuring of the unevenness and non-parallel arrangement of parallel strips. It is merely necessary to replace the receiving prisms 18 and 19 by corresponding receiving blocks for the parallel strips. In the receiving blocks, small balls are pressed in as supporting points for the test piece. The plane face 26 of the strip 28 is set parallel by swinging of the carrier plate 31 by means of the set screws 32 with the assistance of the measuring tracers 21 and 22 to the plane face of the test piece 155 pointing thereto (FIGS. 6, 6a, 6b). Then the measuring process already described in connection with the apparatus of FIG. 1 follows.

FIGS. 6, 6a and 6b, illustrate three measuring steps, which are performed during measuring of the strip-shaped test piece 155.

For these measuring steps result, by example, on the starting instrument 72 (FIG. 1) the recording curves $a_1$, $a_2$ and $a_3$, for which due to the electrical subtraction of the measuring values delivered from the measuring tracers 21 and 22 the following equation system is effective:

$$a_1 = f_1 - f_3$$
$$a_2 = f_2 - f_3$$
$$a_3 = f_1 - (-f_2) = f_1 + f_2$$

The form deviations $f_1$ and $f_2$, respectively, of the test piece 155, as well as the form deviations $f_3$ of a plane face of the strip 28 can be determined pointwise in known manner by solution of the above equation system. An evenness normal is not required for the determination of the form deviations of the two plane faces of the parallel strips 155. The non-parallel appearance of the two plane faces results from the inclination of the curve $a_3$.

With the same material as well as similar configuration and supporting points of the test piece 155 disposed exactly below each other and of the strip 28, the bend through is equal; this is then compensated analogous to the guide errors of the displaceable parts 53 and 54 of the cross slide 52 by electrical means.

In FIG. 7, the measurably swingable part 136 of the table carrying the test piece 20, deviating from FIG. 1, is swung not with the help of an end measure, rather by means of an adjustment device, for instance a screw 138, about its rotary axis 126 and the angle corresponding to the rotation is read on a measuring device 130, 131. The measuring device 130, 131 is thereby a photo-electric grid sensing device of known structure, the output signals of which are fed by means of an electrical conduit 142 of the direction discriminator- and the counter-circuit 70 (FIG. 1).

The uppermost part 135 of a three-part table carrying the receiving prisms 18 and 19 for the test piece 20 is swingable relative to its measurable swingable part 136 by means of a ball pivot 128, 129 as well as rotatably mounted balls 137 about a vertical axis. This swinging is performed by means of two screws 140 provided on both sides of the part 135, which screws 140 are inserted in a counter bearing 141 secured each to the part 136. The rotary axis 121 of the measurably swingable part 136 is mounted in a part 127 disposed on the housing 10. A plate 161 is provided on the measurably swingable part 136, the plane face 160 of the plate 161 being adjusted by means of screws 162, as already described in connection with the embodiment of FIG. 1, perpendicularly to the rotary axis 126 of the measurably swingable part 136.

The setting of the direction of movement of the longitudinal slide 54 (FIG. 1) in a plane perpendicular to the swinging axis 126 of the measurably rotatable part 136 and the alignment of the axial longitudinal section of the test piece 20 formed by the generating line 48 and 48', respectively, perpendicularly to this swinging axis, can take place in an analogous manner, as described in the apparatus of FIG. 1. Deviating from FIG. 1, however, in FIG. 7 the parallel position of the generating line 48 of the test piece 20 to the reference face 26 of the strip 28 can be obtained by swinging the part 136 about its rotary axis 126, and in particular, as it has been stated in connection with the apparatus described in FIG. 1 by means of the measuring tracers 21 and 22. Suitably can thereby such arrangement be made, that after a set parallel position of the generating line 48 of the test piece 20 and of the reference face 26, the indicating value delivered from the reading instrument becomes zero. After sensing of the generating line 48 the measurably swingable part 136 of the table carrying the test piece 20 can then swing with the help of the measuring device 130, 131 about an angle, which differs only slightly from the actual cone angle, and the further measuring process already described in connection with FIG. 1 can be instituted.

The apparatus shown in FIG. 8 for the determination of the form deviations of strip-shaped test pieces is disclosed.

Deviating from the previous embodiments, in FIG. 8, a guide rail 200 is provided, on which a slide 202 is displaceable perpendicularly to the plane of the drawing by means of substantially friction-free mounted rollers 201. Rotary axes 281 are arranged for the rollers 201. The longitudinal slide 202 in turn is the carrier of a cross slide 203, which is displaceable by means of a threaded spindle 204 in the direction of the arrow 205. The threaded spindle 204 is easily rotatably mounted in bearing blocks 280. The cross slide 203 consists of the actual guide part 206 and a carrier part 207 secured thereon, which supports itself directly as well as over a web 208 on the guide part 206. The displacement path of the slide 203 is readable on a micrometer drum 209 of conventional structure. On the carrier part 207 a slide member 210 and 211 are displaceably mounted. The slide pieces 210 and 211 are carriers of the measuring tracers 212 and 213, which are swingable about axes 214 and 215 extending perpendicularly to the plane of the drawing FIG. 8. The measuring tracers 212 and 213 are furthermore rotatable in a holder 218 and 219, respectively, about an axle 216 and 217, respectively disposed crosswise to the mentioned axes 214 and 215, respectively. The measuring tracers 212 and 213, respectively, are fixed in the holder 218 and 219, respectively, by means of screws 220 and 221, respectively. The measuring tracers 212 and 213 perform during the measuring process rotary movements about their axes 214 and 215, which by means of the shorter lever arm are covered in the drawing by the master tracer housing 223 and 224, respectively, in known manner, for instance by induction means, causing the dislocation of a bridge. The electrical output signal of the measuring tracers 212 and 213 are guided by means of electrical conduits 225 and 226 in the manner shown in FIG. 1 to potential dividers, which are provided for the rectification of the output signals of the measuring tracers 212 and 213.

Deviating from FIGS. 1–7, in FIG. 8, however, the output signals, delivered from the measuring tracers 212 and 213 by means of the conduits 225 and 226, are added in the following electrical structural unit following the potential dividers. In the electrical structural unit are, as already described in the apparatus of FIG. 1, the error signals amplified and rectified in dependency upon the phase.

For the measuring steps for the determination of the form deviation of three strip-like test pieces 230, 230' and 230'' (230'' is not shown in FIG. 8) there results, by example, on the writing instrument following the electrical structural unit (identified in FIG. 1 by numeral 72) the recording curves $a_{10}$, $a_{20}$ and $a_{30}$, for which, due to the electrical addition of the measuring values delivered from the measuring tracers 212 and 213, the following equation system is effective:

$$a_{10} = f_{10} + f_{20}$$
$$a_{20} = f_{10} + f_{30}$$
$$a_{30} = f_{20} + f_{30}$$

The form deviations $f_{10}$, $f_{20}$, and $f_{30}$, respectively, of the plane face of the strip-like test pieces 230, 230', and 230'' (230'' is not shown in FIG. 8) can be determined point by point in known manner by solution of the above stated equation system.

With the same material, as well as the same configuration supporting points of the strips 230, 230' and 230'' being exactly superposed relative to each other, the bending through is equal; the latter is then compensated analogous to the guide errors of the displaceable slide by electrical means.

The strip-like test piece 230, 230' and 230'', respectively, is mounted on a three-point support. Supporting points are provided in FIG. 8 such as, by example, pins 235 and 236, which are pressed into stands 240. Instead of the pins 235 and 236 also ball supports are suitably used. The angular stands 240, between which the strip-like test pieces 230, 230' and 230'' (230'' is not shown in FIG. 8) are disposed, are secured on a plane base plate 250 on which also the guide rail 200 is disposed for the cross slide 202, 203. For adjusting purposes, the holders 218 adjusting 219 for the measuring tracers 212 and 213 are secured by means of a pair of blade springs 255 and 256 on the slide pieces 210 and 211 and are adjustable as to their height in fine steps by means of angles 260 and 261, by example, by means of screws 270, 271. Clamping screws 272 and 273, respectively, are arranged in FIG. 8 for the slide pieces 210 and 211 carrying the measuring tracers 212 and 213. The displacing path of the longitudinal slides 202 is measurable by means of a measuring device (not shown in FIG. 8), for example, by of a photo-electric grid sensing device. The adjustment of the slide 202 is performed suitably by means of a so-called Bowden-cable.

Referring now to FIG. 11 of the drawings, the apparatus disclosed in FIG. 8 is equipped now with an additional device which permits without high expenses that this apparatus can be used also in connection with work pieces of large measurements for testing of, for example, groove-like recesses or the like. In order to perform such testings, in FIG. 11 the counter holder 290 is provided on the slide 202 which supports itself by means of rollers 201 on the guide rail and which is connected with the longitudinal slide 202 by means of a securing screw 291 as well as a pull spring 292.

As shown in FIG. 8, in the longitudinal slide 202 is arranged a receiving bore 300 for the securing screw 291 and a threaded bore 301 for the securing hook of the pull spring 292, so that the shift to an apparatus in accordance with FIG. 11 can be performed simply and speedily. In FIGS. 11 and 12 are additionally provided two angular stands 310, which are immovably secured to a plane base plate 320. On the inner side of the mentioned stand 310 a plurality of pairs of oppositely disposed supporting angles 330 are secured for the guide rail 200. The guide rail 200 is inserted in dependency from the height of the test piece 350 in one of the pairs of the mentioned supporting angles 330. Two pins 360 (FIG. 12) projecting on the end side of the guide rail 200, grip play-free in grooves 370 of the supporting angle 330 and assure also a lateral centering of the guide rail 200.

I claim:

1. An apparatus for measuring of form-, position- and measure-deviations on test pieces and the like by means of a sensing system, which is displaceable relative to said test pieces, wherein said sensing system comprises two measuring tracer means which deliver measuring values, the measuring value indicating the momentary value of the prevailing deviation of said measuring tracer means perpendicular to the surface of said test pieces, one of said measuring tracer means sensing the surface of said test pieces during its displacement, a reference means coordinated to said test pieces, the other of said measuring tracer means sensing simultaneously said reference face means, means for employing both measuring values delivered from said measuring tracer means jointly for the determination of error values on points of the surface of said test pieces, a cross slide carrying said two measuring tracer means and including a bed, a multi-part table including an uppermost part and a plurality of lower parts, said uppermost part carrying said test piece, means for rotating said bed and said uppermost part of said table about an immovable rotary point about a vertical axis, for the purpose of adjustment, said immovable rotary point comprises a ball pivot, said table has at one of its lower parts, which is measurably swingable, a plane face adjustably secured thereto, and one of said measuring tracer means is rotatably mounted on said cross slide about an axis disposed in longitudinal direction, for sensing said plane face to be set on a swinging axle disposed in cross direction and arranged perpendicularly to said axle.

2. The apparatus, as set forth in claim 1, wherein said measurably swingable part of said table comprises a swingable sine table, said adjustment device mounted on said sine table comprises two parts, one of said parts constituting said uppermost part of said table rotatable about said vertical axis, and said lower part is swingable relative to said sinus table about an axle disposed in cross direction and parallel to the swinging axle of said sine table.

3. The apparatus, as set forth in claim 1, which includes a measuring device for setting and reading the displacement amount of said swingable part of said table carrying said test piece.

4. The apparatus, as set forth in claim 3, wherein said measuring device comprises a photoelectric grid sensing device.

5. The apparatus, as set forth in claim 3, wherein said measurable swingable part is rotated by means of a displacement member about an axle disposed in cross direction, and said measurable swingable part, as well as the immovable part carrying a swingable axle is a carrier for said measuring device consisting of a measuring division and a reading instrument.

6. An apparatus for measuring of form-, position- and measure-deviations on test pieces and the like by means of a sensing system, which is displaceable relative to said test pieces, wherein said sensing system comprises two measuring tracer means which deliver measuring values, the measuring value indicating the momentary value of the prevailing deviation of said measuring tracer means perpendicular to the surface of said test pieces, one of said measuring tracer means sensing the surface of said test pieces during its displacement, a reference face means coordinated to said test pieces, the other of said measuring tracer means sensing simultaneously said reference face means, means for employing both measuring values delivered from said measuring tracer means jointly for the determination of error values on points of the surface of said test pieces, a cross slide carrying said two measuring tracer means and including a bed, a multi-part table including an uppermost part and a plurality of lower parts, said uppermost part carrying said test piece, means for rotating said bed and said uppermost part of said table about an immovable rotary point about a vertical axis, for the purpose of adjustment, means for fine setting of the position of said uppermost part of said multi-part table, as well as of the position of said cross slide carrying said measuring tracer means, said fine setting means comprising two adjustment screws disposed on opposite sides on both sides, means for setting said reference face means as to its height comprising a carrier plate having three set screws and being swingable about an axis disposed in longitudinal- and cross-direction, respectively, and said bed of said cross-slide is equipped with three set screws.

* * * * *